July 31, 1934.   J. BIJUR   1,968,022
LUBRICATION
Original Filed Sept. 17, 1925   5 Sheets-Sheet 3
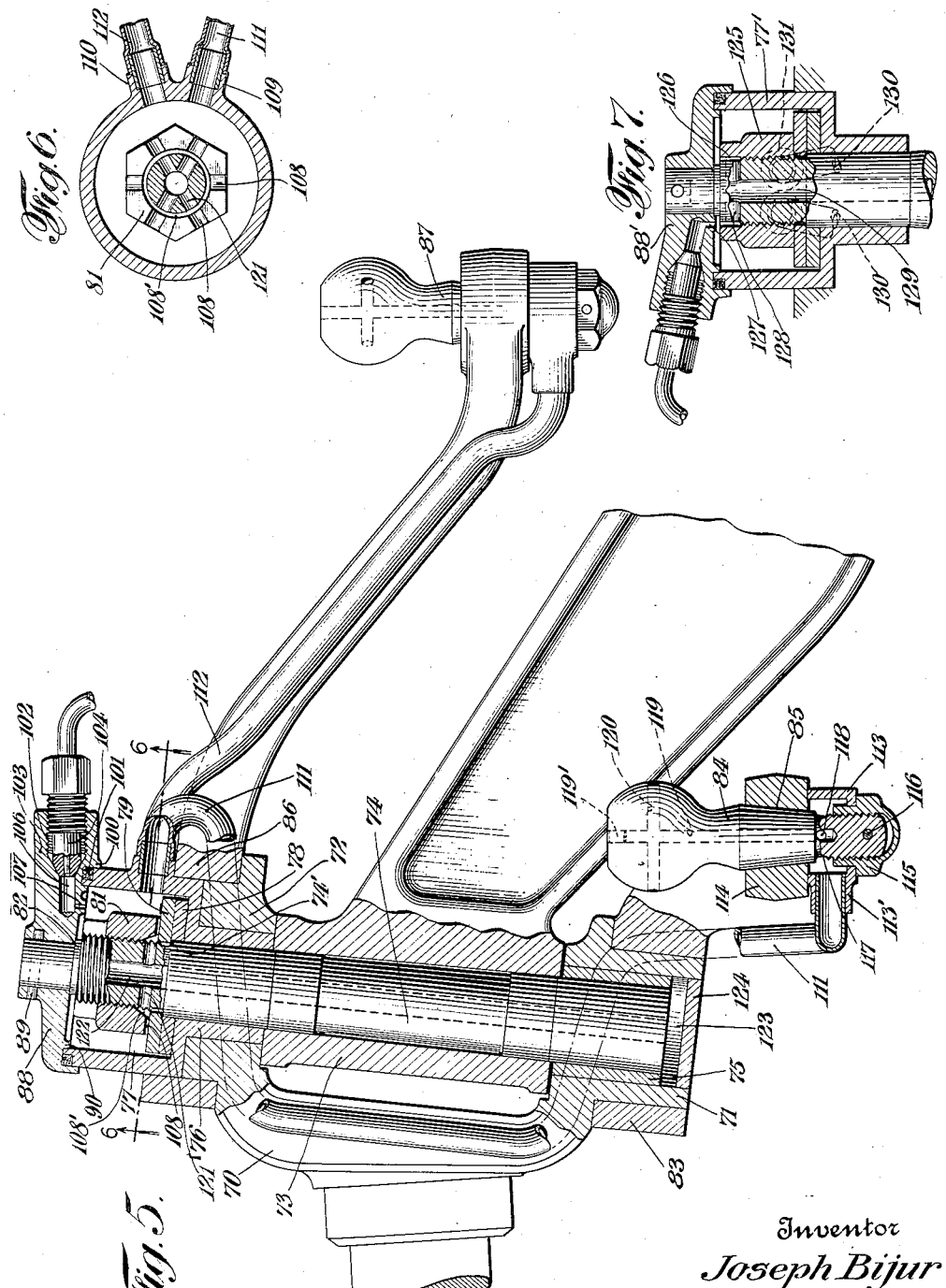

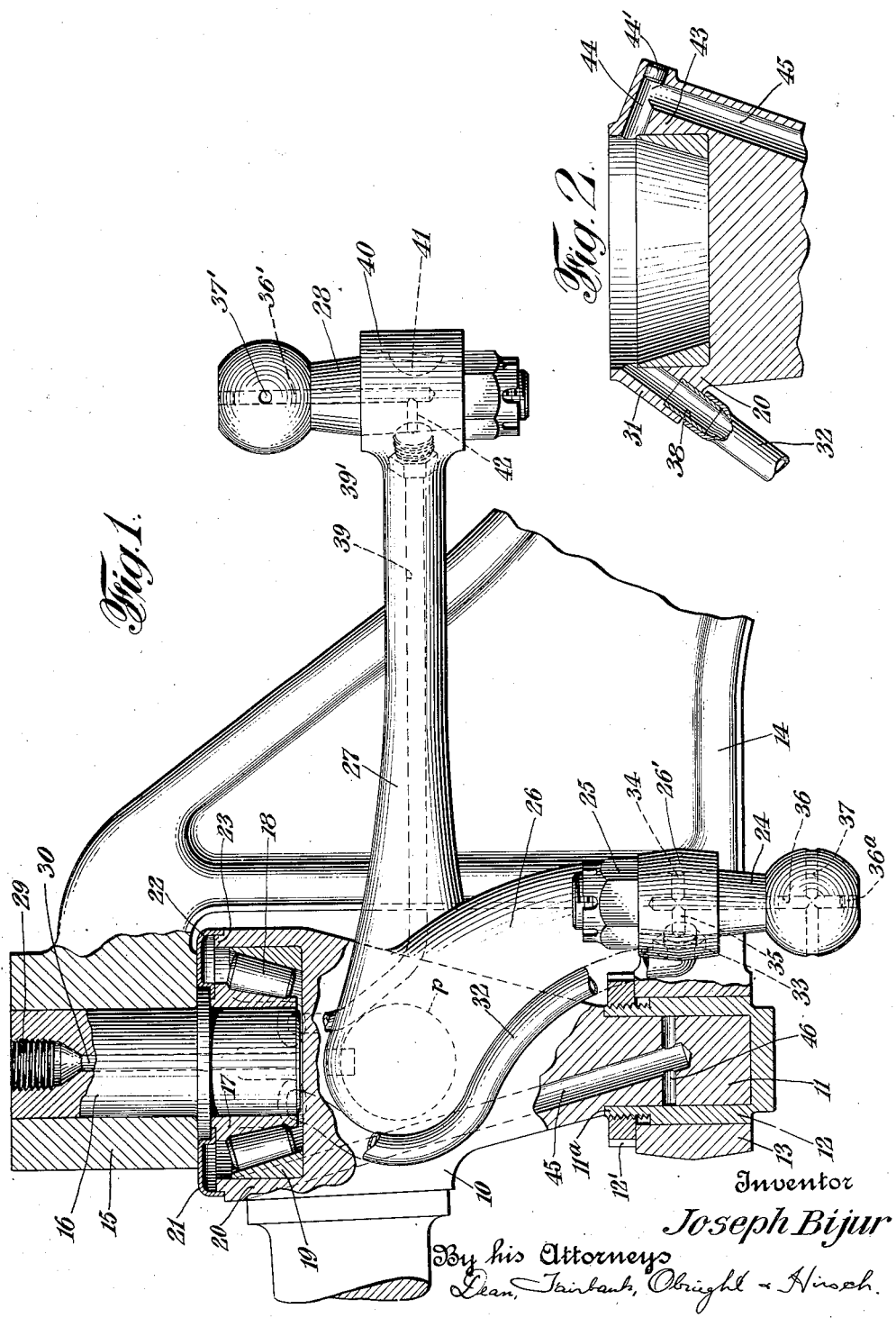

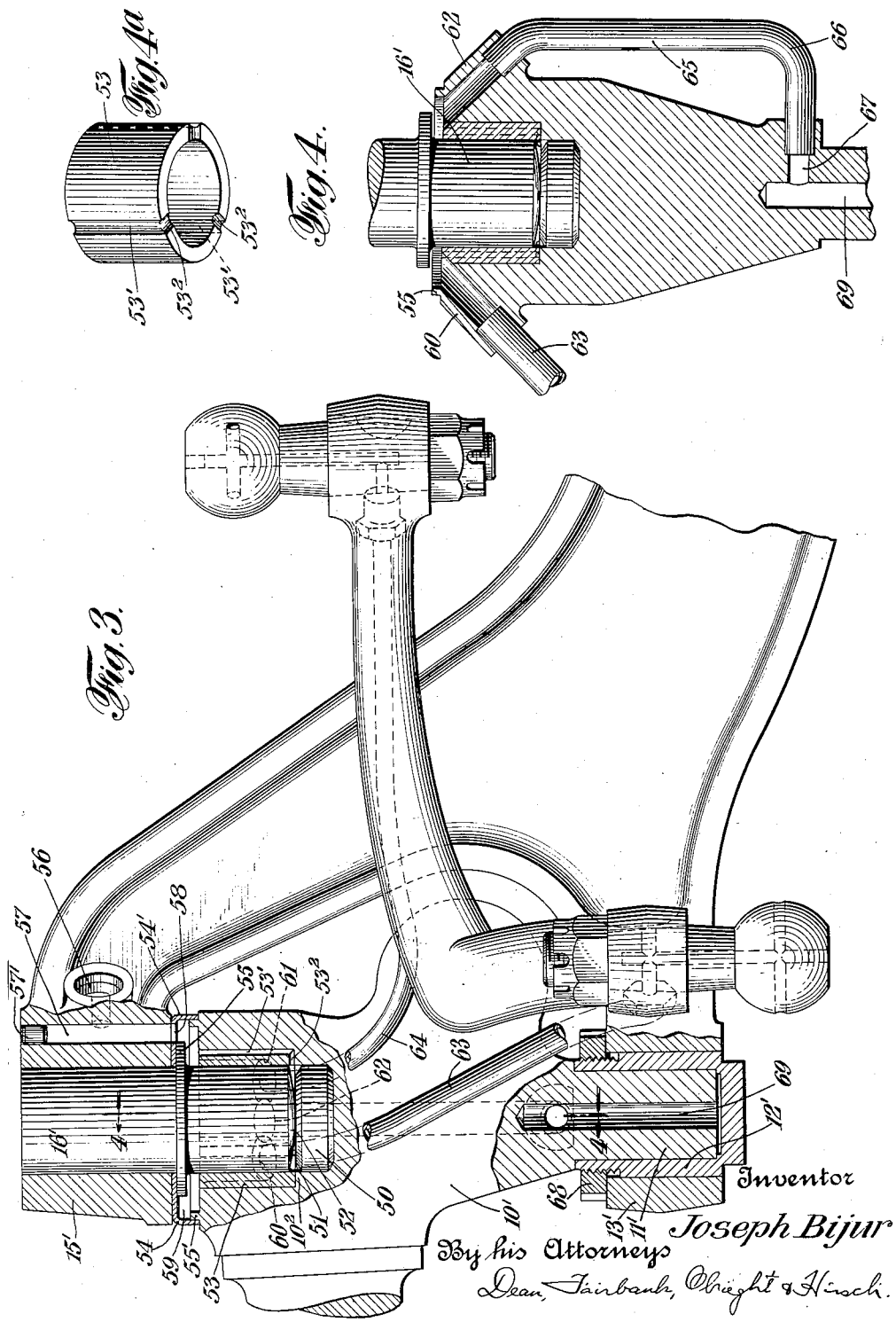

July 31, 1934.   J. BIJUR   1,968,022
LUBRICATION
Original Filed Sept. 17, 1925   5 Sheets-Sheet 4
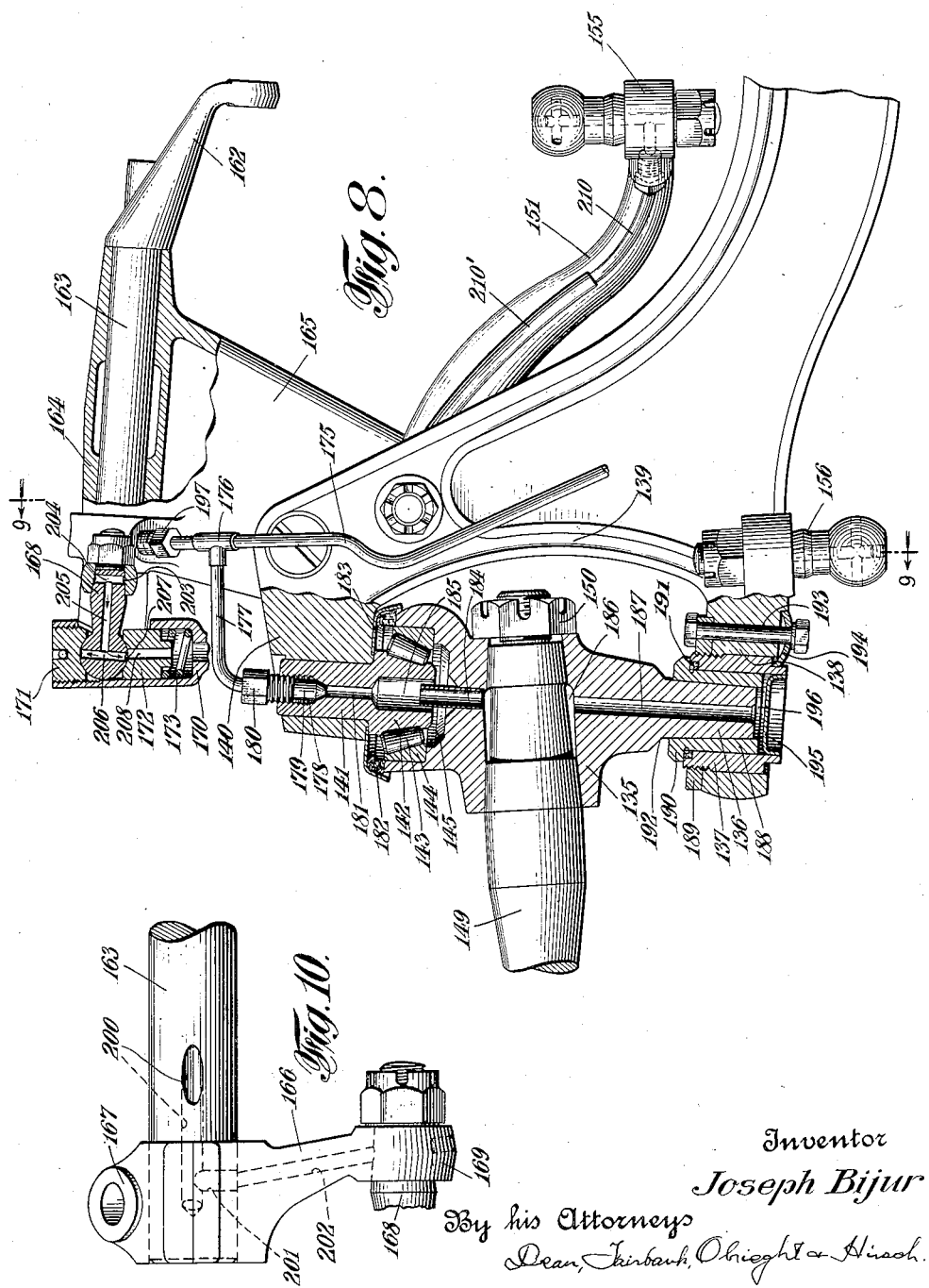
Inventor
Joseph Bijur
By his Attorneys

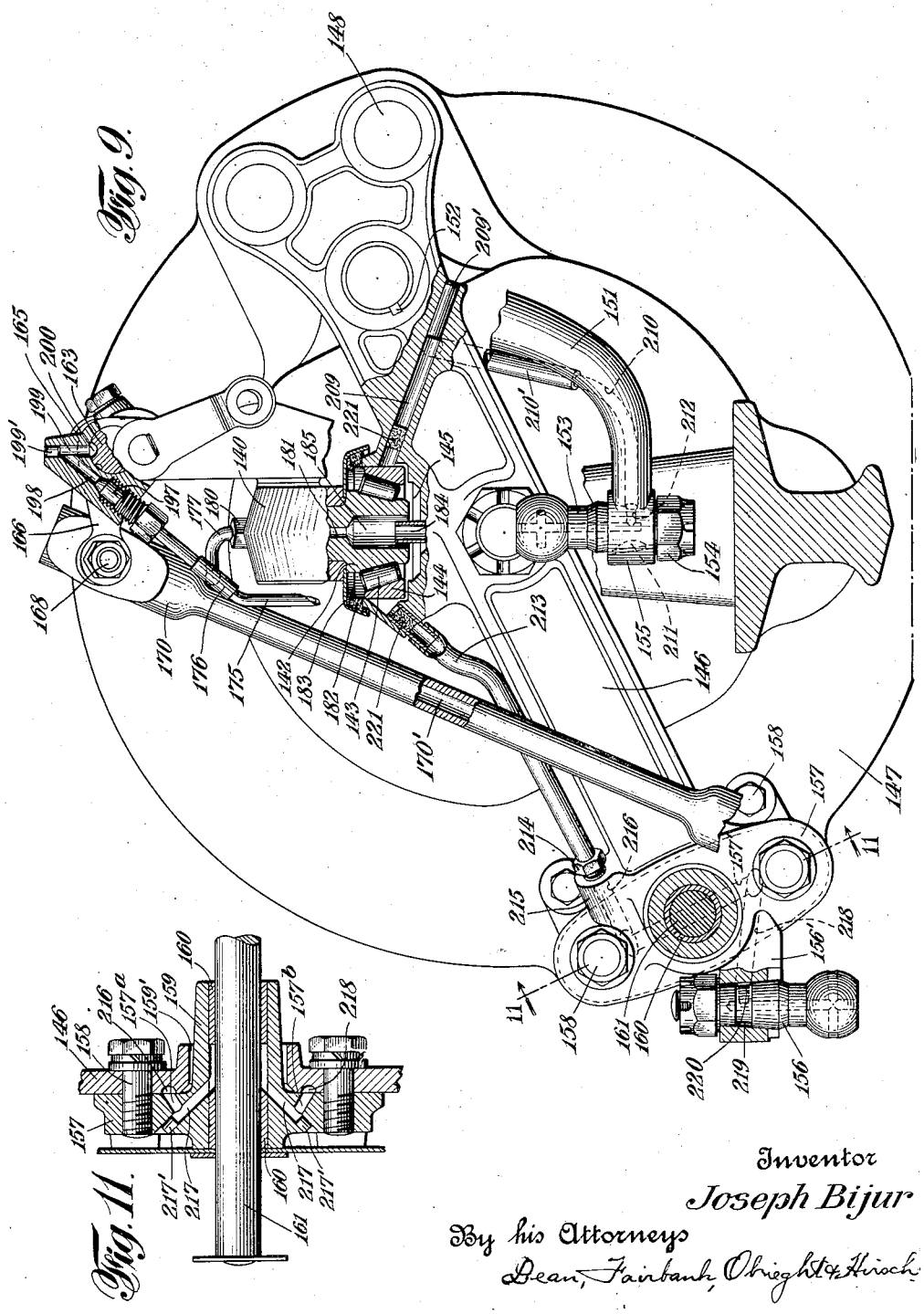

Patented July 31, 1934

1,968,022

UNITED STATES PATENT OFFICE 1,968,022

LUBRICATION

Joseph Bijur, Long Island City, N. Y., assignor to Auto Research Corporation, a corporation of Delaware Application September 17, 1925, Serial No. 56,811
Renewed May 26, 1932

37 Claims. (Cl. 184—7)

My present invention relates to a lubricating system, particularly adapted to the lubrication of a plurality of bearings by gravity flow from an elevated lubricant source, and having a specific application to steering knuckles of motor vehicles, and provides convenient means for reliably supplying with clean oil all or any number of the bearings carried by or associated with a structure such as the knuckle, and without the need for selective manipulation by direct manual access to the individual bearings, and without the use of any auxiliary swivels or protruding or projecting conduits likely to be torn loose in ordinary use of the vehicle.

The invention from one aspect is more especially directed toward the adequate lubrication of the thrust bearing that sustains the weight of the vehicle upon the knuckle. To this end, the thrust bearing is formed to retain a substantial charge of oil, and all or a substantial part of said bearing is disposed below an overflow leading to other bearings.

Preferably, the thrust bearing is conformed as, or contained in a well or receptacle into which substantially all the lubricant from the source is admitted in the first instance effectively submerging the bearing, only excess beyond the requirements of the thrust bearing being permitted to flow therefrom to supply the other bearing surfaces on the knuckle.

In a specific embodiment, the thrust bearing surface is enclosed in a well near the upper part of the knuckle, from which the other bearing surfaces on the knuckle derive their lubricant through one or more overflow pipes draining the well from a level above that of the lowest part of the thrust bearing surface.

From another aspect, the invention is concerned with the delivery of lubricant to various bearings on the knuckle, by flow, through corresponding pipes or conduits, each directly connected to a distributing well on the knuckle.

Preferably a closure about the rim of the well or the thrust bearing receptacle is provided to exclude dust therefrom, without however, interfering with the free pivotal movement of the knuckle, said dust excluding closure, in general also excluding air, during use and thus interfering with the adequate venting of the conduits in pipes supplied from the well.

In such relation, correct division between the several bearings of the knuckle may be assured by utilizing the principles fully described in my copending application, Serial No. 39,415 filed June 25, 1925 in order to eliminate the blocking effect of any air trapped in the piping system and to obviate draining from a higher through a lower bearing by a siphonic action.

While the lubricant according to the present invention may be poured by hand directly into the well or thrust bearing receptacle, it is preferred, as in my copending application referred to, to supply the knuckle from a pressure lubrication system from which the lubricant is allowed to flow by gravity across one of the swivel bearings by which the knuckle is associated with the axle.

In the accompanying drawings in which are shown one or more of various possible embodiments of the several features of the invention, Fig. 1 is a front view partly in section of an axle with my preferred form of front knuckle, Fig. 2 is a fragmentary sectional view through the thrust bearing of Fig. 1, Fig. 3 is a view similar to Fig. 1 of another embodiment.

Fig. 4 is a fragmentary sectional view taken along the line 4—4 of Fig. 3,

Fig. 4a is a perspective view of a bushing,

Fig. 5 is a view similar to Fig. 1 of another embodiment,

Fig. 6 is a sectional view taken along the line 6—6 of Fig. 5,

Fig. 7 is a fragmentary sectional view of an alternative construction of the upper end of Fig. 5, Fig. 8 is a view in longitudinal section of a steering knuckle including a brake mechanism, Fig. 9 is a section taken along the line 9—9 of Fig. 8, Fig. 10 is a plan of a detail of Fig. 9, and Fig. 11 is a detail sectional view taken along the line 11—11 of Fig. 9.

Referring now to Figs. 1 and 2 of the drawings, I have illustratively shown a special embodiment of knuckle devoid of a separate king pin. In this case, the knuckle forging 10 is formed with an integral bearing stud 11 at the lower end thereof, fitting in a corresponding bushing socket 12 in the lower clevis jaw 13 of the axle 14, said bushing held in place by a nut 12' and drawn against a shoulder 11a on the knuckle. The upper clevis jaw 15 of the axle has press-fitted thereinto a bearing stud 16 extending downward therebelow into the inner race 17 of a thrust bearing having inclined rollers 18 within an outer race 19 fitting in a corresponding well 20 in the upper face of the knuckle 10. A sheet metal cap 21 is interposed between the upper clevis jaw 15 and the inner race 17 and has a skirt 22 overlapping a pilot flange 23 on the knuckle, thereby excluding dust. The knuckle is provided with a taper socket, in which is fitted a plug $p$ formed integral with a forked construction including a tie rod arm 26 and a steering arm 27. The tie rod arm has a downwardly extending ball stud 24 wedged by nut 25 for a taper fit into the eye at the end thereof, and the steering arm 27 has a similar ball stud 28 extending upward.

According to the present invention, the various bearings including the thrust bearing 18, the pivot bearings 12 of the knuckle and the tie rod and drag link bearings 24 and 28 respectively are all lubricated from a single source. For this purpose, an oil inlet preferably a drip plug (not shown) which may be of the type disclosed in the copending application of Edward H. Kocher, Serial No. 22,104, filed April 10, 1925, now Patent No. 1,943,326 supplied from a point of control on the chassis, is mounted in a corresponding socket 29 in the upper or outer end of the friction-fitted stud 16 and delivers through an axial bore 30 in said stud into the bottom of the socket 20. The lubricant will substantially fill the socket, submerging the rollers 18 and the bearing surfaces therefor to maintain the latter adequately lubricated. Overflow from the upper part of the well 20 is delivered to the lower knuckle bearing stud, the tie rod bearing, and in the case of the left-hand knuckle shown, also to the drag link bearing. For this purpose, the well 20 is formed with a pair of integral bored bosses to one of which, designated by numeral 31, is connected a metal pipe 32 extending downward and into a corresponding socket 33 in the eye 26' on the tie rod arm, and delivering to a peripheral groove 34 about the tie rod bearing stud at the taper joint, from which lubricant passes through a radial bore 35 and an axial bore 36 plugged at its outer end 36ª to the ball bearing thereof by way of radial bores 37.

The joint between the upper end of pipe 32 and boss 31 is similar to that shown in Fig. 3 of my copending application above identified, and comprises a short length of tube 38 press-fitted into the boss and having telescoped over the outer end thereof, the correspondingly enlarged end of the pipe 32.

The drag link bearing is similarly supplied by overflow from the well 20 by way of pipe 39, which extends along the drag link arm into the eye 40 thereof, the drag link stud being bored in the same manner as the tie rod stud, corresponding reference numerals being applied to corresponding parts, with primes. In this embodiment, I have shown instead of the peripheral groove 34 at the tie rod stud, merely a radial bore 42 maintained by a Woodruff key 41 in accurate alignment with the pipe outlet 39. To supply lubricant to the lower thrust bearing, I have appropriately bored in this embodiment the structure of the knuckle itself, a corresponding boss 43 on the knuckle having a transverse bore 44 therein, communicating with the upper part of the thrust bearing race and plugged as at 44' at its outer end and delivering into an oblique bore 45, terminating near the central axis of the lower thrust bearing 11 and delivering through radial bores 46 outward to the bearing surface thereof.

In the construction described, it is seen that the lubricant first flows into the thrust bearing well before it flows to the other bearings. Thus, the lubricant must first substantially completely fill the thrust bearing well 20 and adequately lubricate said bearing, only excess above the upper rim thereof passing onward to the drag link, the tie rod, and the lower knuckle bearings.

In Figs. 3 and 4 is shown the lubrication of a knuckle specifically different, but of the same general type as that of Figs. 1 and 2. This embodiment includes a knuckle forging 10' having an integral pivot stud 11' at its lower end, substantially as in Figs. 1 and 2, corresponding parts having the same reference numerals primed.

In lieu of the roller bearing 18, I have here indicated a plain bearing including a thrust block 50 fitted into the bottom of a well 51 in the upper end of the knuckle and affording a bearing for the rounded inner end 52 of the upper pivot bearing stud 16', which is press-fitted into the upper axle clevis jaw 15' and bears in a bushing 53 friction-fitted into the side wall of the well and pressed against a corresponding annular shoulder 10² in the knuckle. A dust-proofing cap 54 is held by an integral flange 55 of the stud 16' against the upper clevis jaw 15' and has an integral skirt 54' fitting about a pilot flange 55' integral with the knuckle.

I have shown the lubricant from the axle illustratively admitted from a centralized chassis system through a socket 56 formed in the upper clevis jaw, which communicates with a bore 57 longitudinally thereof, said bore plugged as at 57' at its upper end and delivering through a corresponding aperture 58 into the cavity 59 about the stud 16' and between the upper face of the knuckle and the inner face of cap 54. Bushing 53 is formed with a plurality of longitudinal grooves 53' at its exterior and notched as at 53² at its lower edge at each said groove, to afford a passageway through which lubricant will readily drain from well 59 into the bottom of the thrust bearing well, some one or more of said grooves and notches venting air from the well as the lubricant enters through the others. The knuckle is provided with oblique bosses 60, 61 and 62 at its upper end, bored as shown to determine inlet apertures from the flat annular face of the knuckle between stud 16' and pilot flange 55. A pipe 63 of relatively large diameter is fitted at its upper end into bore 60 and leads to the tie rod stud, while a pipe 64 is similarly connected between bore 61 and the drag link ball stud thereof.

To supply lubricant to the lower knuckle pivot bearing, I have shown in this embodiment a pipe 65 fitted at its upper end into the oblique boss 62, extending downward and having a rectangular bend 66 at its lower end which extends inward into a radial bore 67 in the knuckle immediately above the lock nut 68 for the bushing cap 12'. The radial bore 67 delivers into a longitudinal bore 69 extending axially along the length of the lower pivot stud 11', through which the lubricant passes to the bottom of the bushing cap 12 and rises therefrom to the bearing surface thereof.

After the thrust bearing well is filled with oil, all additional lubricant charge supplied to the knuckle will pass through outlets 60, 61 and 62 to the corresponding bearings. Any deficiency in said well is supplied before the other bearings can receive any substantial additional charge.

In the embodiment of Figs. 5 and 6 is treated a knuckle 70 provided with clevis jaws 71 and 72, straddling the eye 73 of an axle through which extends a king pin 74 friction-fitted thereinto near the upper and lower ends of the eye and affording a bearing at its lower end in a bushing 75 press-fitted into the lower jaw of the clevis. The bushing 76 for the upper end of the king pin is press-fitted into the knuckle and extends thereabove in the form of a well 77 enclosing a thrust bearing, the lower washer 78 of which rests on the bottom of the well and the upper washer 79 of which is keyed to the king pin. A nut 81 within the thrust bearing well 77 threaded upon the upper end of the king pin, presses washer 79 against a shoulder 74' on the king pin and is maintained locked in position. The tie rod arm has an eye 83 press-fitted over and bolted to the lower end of the knuckle, into the outer end of which the tie rod ball stud 84 is secured by a taper fit at 85. The drag link arm has an integral eye 86 press-fitted over and bolted to the knuckle and over the exterior wall of well 77, the outer end of said arm having press-fitted thereinto an upwardly extending ball stud 87 similar to that for the tie rod.

For lubricating the present embodiment of knuckle, I have provided a cap 88 closing the upper end of the well 77 and pinned at 89 to the upper end of the king pin. The cap has an inner pilot 90 and an outer flange 100 embracing the inner and outer walls of the well 77 and exerting compression on an annular gasket 101 enclosed therebetween, whereby dust will be excluded, without interfering with the pivoting movement of the knuckle and the well 77 relative to the axle and the fixed cap 88. The lubricant is admitted into a socket 102 in a lateral boss 103 on the cap in which is secured a drip plug 104 of the general type described in the copending application of Edward H. Kocher above mentioned, said drip plug delivering into a bore 106 in the cap, which drains through a downward bore or nozzle 107 into the well 7. The lubricant from the well readily passes to the thrust bearing surface from about the periphery of the washer 79. Some of the lubricant will seep slowly without substantial loss from the well 77 to the bearing of the king pin in bushing 76. The well 77 is provided with a pair of external bosses 109 and 110 to the former of which is applied the upper end of a pipe 111 leading downward along the structure of the knuckle to the tie rod ball stud 84, the other boss 110 similarly mounting a pipe 112 leading generally downward along the drag link arm to the bearing of the latter.

In the present embodiment, the ball studs of the tie rod and drag link are shown devoid of any transverse bore in the taper-fitted part thereof and are, accordingly, mechanically stronger than studs so bored. Instead, a hollow metal block or collar 113 with a boss 113' thereon into which the outlet end of pipe 111 is fitted, is pressed against the lower face of the tie rod eye 114 by a nut 115 threaded upon the lower end of the shank of the ball stud, said nut having a shoulder pressing against the block 113, whereby the taper fitted portion 85 is drawn tight as is the block 113, a taper pin 116 securing the nut against coming loose. The ball stud is provided with a groove 117 and radial bores 118 located as shown beyond the area where the taper fit occurs, communicate with an axial bore 119 through the stud, plugged as at 119' at its outer end which in turn delivers to the surface of the ball member, through one or more radial bores 120 in said ball. The nut 115 is closed at its lower end and the locking pin 116 is of taper form, so as to render the construction oil-tight.

The lower king pin bearing is lubricated by oil overflowing above the level of the thrust bearing 78—79. For this purpose, the lower face of the nut 81 is provided with radial grooves 108 leading into an annular passage 108' at the inner periphery of the nut, which delivers into an adjacent radial bore 121 in the threaded part of the king pin. Bore 121, in turn, drains into a longitudinal or axial bore 122 extending substantially the entire length of the king pin and emptying into a well 123 at the bottom thereof, determined by a friction-fitted closure disk 124 in the lower end of the knuckle.

In Fig. 7 is shown a fragmentary view of a modification. The nut 125 is here provided with a deep annular groove 126 extending from its upper face down to substantially the threaded part thereof and which is aligned with the outlet bore or nozzle 127 in the cap 88'. This groove communicates with a radial bore 128 in the corresponding part of the king pin, from which the lower knuckle swivel bearing is supplied through longitudinal bore 129 in the king pin. The drag link and tie rod conduits 130 are fitted in bosses 131 similar to those in Fig. 5.

In operation of the present system, it will be understood that lubricant admitted through the drip plug will in the first instance enter the deep groove 126 from which some will pass through bore 128 into the king pin bore 129 to supply the lower bearing of the king pin, the overflow from said groove passing about the outside of the nut into the bottom of the thrust bearing well 77' for lubricating the thrust face of the latter in the same manner as in Fig. 1, the overflow above the level of the thrust bearing draining through pipes 130 as in the embodiment of Figs. 5 and 6.

In the embodiment of Figs. 8 to 11, I have shown an arrangement for lubricating from a centralized point of control, various bearings of a steering knuckle, equipped with a brake mechanism of construction in itself old. In the embodiment shown, the knuckle comprises a forging 135 having an integral lower stud 136 bearing in a bushing 137 in the lower jaw 138 of an axle clevis 139, the upper jaw 140 of which has friction-fitted thereinto a stud 141 formed at its inner end as the inner race 142 of a roller bearing 143, the outer race 144 of which seats in a corresponding well 145 in the upper end of the knuckle. The knuckle forging is formed with a unitary cross bar 146 extending obliquely substantially the diameter of the brake shield 147 which is secured thereto as by bolts 148. The wheel spindle 149 in this embodiment is a separate member with a taper fit within a corresponding socket in the knuckle, jammed tight by means of a lock nut 150 at the inner end thereof. In this embodiment, a drag link arm 151 is keyed as at 152 to the cross bar and extends downward therefrom in a curve, the pivot stud 153, in this case a ball stud, being secured by means of nut 154 for a taper or wedge fit within an eye 155 in the outer end of the arm. The tie rod stud 156 which in this embodiment extends downward, is similar in construction to stud 153 and is secured in an arm 156' formed integrally with cross bar 146. The brake cam shaft 161 bears in a hub 159 formed integral with a cover plate 157 which is bolted as at 158 to the cross bar, the hub protruding through a corresponding aperture 159' in the cross bar. Bushings 160 are press-fitted into opposite ends of the hub 159 and provide a bearing for the cam shaft 161.

The brake cam shaft 161 is operated from the frame of the vehicle by a familiar linkage system (not shown) extending from the frame and linked to the arm 162 at the end of a horizontal rock shaft 163 having a bearing 164 in a bracket 165 formed as a rigid part of the axle and above the knuckle. A rock arm 166 is keyed at 167 to shaft 163 and the shank of a ball stud 168 is taper-fitted in a corresponding tapered eye 169 formed at the outer end of arm 166.

The ball of the stud 168 extends into the enlarged upper end of a pitman link 170 and is held therein between a fixed ball cup 171 and a ball cup 172 pressed thereagainst by coil spring 173. The lower end of the pitman is similarly connected by a ball stud (not shown) to an arm (not shown) keyed to the brake cam shaft 161.

According to my invention, the various bearings set forth, associated with the knuckle are lubricated from a single conduit 175, in this case, extending along the axle, which conduit may, in turn, derive lubricant from a central source (not shown) controlled from the frame. The conduit 175 leads to a T fitting 176 the stem of which is connected through a length of pipe 177, with a socket 178 in the outer end of the stud 141, in which is disposed a drip plug unit 179 of the type hereinbefore referred to, held in place by a bushing 180 which also effects a compression coupling connection (not shown) for the end of the pipe 177. The stud 141 is provided with an axial hole 181 through which the lubricant from the drip plug passes into the well 145 of the thrust bearing. Dust is excluded from said thrust bearing by a gasket 182 upon the rim of the socket, pressed tight by a sheet metal closure cap 183, having a skirt extending downward therebelow and pressed at its inner rim between the stud 141 and the upper axle clevis jaw 140.

There is press-fitted axially of the knuckle a short length of pipe 184 extending from the wheel spindle 149 into the well 145, upward to a point well above the lower ends of the thrust bearing rollers 143. The bore 181 is enlarged at its lower end at 185 to a diameter greater than that of tube 184, the lubricant from the drip plug 179 thus trickling down the wall of said enlarged bore 185 into the well bottom and not directly into the tube 184. The lower end of tube 184 communicates with a peripheral groove 186 about the spindle which, in turn, communicates with a bore 187 therebelow along the swiveling axis of the knuckle through the bottom of the pivot stud.

To render possible the assembly of the knuckle with its unitary stud 136 between the jaws of the clevis, the bore in the lower clevis jaw is of materially larger diameter, so that the shank of the knuckle can readily be inserted therein to bring the thrust bearing under stud 141 after which the knuckle is raised to its final position. A sleeve 188 inserted through the bottom is pressed over the bearing stud and bearing bushing 137 for said sleeve is then inserted in the annular space between the clevis eye 138 and the sleeve 188, a nut 189 which had previously been slipped over the shank of the socket being then threaded home as shown, forcing the bushing 137 upward against the flange 190 of the sleeve. Preferably a dust excluding gasket 191 is compressed into a corresponding annular groove in the bushing 137 by contact with flange 190. The nut 189 is locked by a bolt 193 therethrough extending through the thickness of the lower clevis eye and exerting pressure through a spring washer 194 against the bushing 137 to lock the latter in position. A sheet metal cap 195 is press-fitted into the lower end of the bushing 137 to render the construction lubricant tight and affords a well 196 for lubricant to supply the lower pivot bearing of the knuckle.

In the bearing bracket 164 for the cross shaft 163 is mounted another control fitting such as a drip plug 197 supplied from the outlet arm of T fitting 176 and delivering upward through an oblique bore 198 therefrom which communicates with a downward passage 199 bored from the outer upper end of said frame and plugged at 199' at its outer end. The bore 199 delivers into an oblique bore 200 in the rock shaft 163 which oblique bore delivers through a radial bore 201 into a bore 202 extending the length of the rock arm 166 said bore delivering into the taper socket 169. From the taper socket lubricant passes into a peripheral groove 203 about the shank of the pivot stud 168 and thence by way of a radial bore 204 into a longitudinal or axial bore 205 along the pivot stud which delivers through a diametral bore 206 to a peripheral groove 207 about the ball and, accordingly, lubricates the bearing surface thereof in cups 171 and 172.

To feed the lubricant onward from the upper to the lower bearing of the pitman 170 said element is formed hollow with a longitudinal bore 170' a longitudinal bore 208 is provided in the lower of the ball cups 172 and a similar arrangement (not shown) is employed at the lower end of the pitman. The lubricant from the drip plug 197 will, accordingly, pass into the bore 198 bore 199 thence into oblique bore 200 and radial bore 201 to the bore 202 in the arm 166 and thence into and through the pivot ball stud 168 to the upper bearing, the overflow from which passes through bore 208 to and through the hollow pitman link to supply the lower bearing thereof.

The drag link bearing 153 is supplied through an oblique bore 209 formed near the upper end of the cross arm 146 and having its inlet end terminating between the upper and lower ends of the wall of the thrust bearing socket or well 145. The outer end of the bore 209 is plugged at 209' so that the lubricant admitted thereinto can be delivered into a large pipe 210' fitted by an appropriate terminal into the cross arm at bore 209 and extending downward along the length of the drag link arm, said pipe 210' being joined to a small pipe 210 which continues along the arm to the taper eye 155 of the pivot stud. As in the case of the drag link stud of Fig. 1 the pivot stud is here shown held in position by a key 211 so that a radial bore 212 therein is maintained in alignment with the outlet of pipe 210 to deliver lubricant therethrough to an arrangement of bores similar to that there shown and accordingly not again shown. An arrangement of conduits broadly similar to that described also drains lubricant from the thrust bearing well, said conduit 213 extending downward along the cross arm and having an appropriate outlet terminal 214 secured in a corresponding socket 215 formed in the lower end of the cross arm 146. The hub flange 157 is drawn tight and snug against the correspondingly machined face of the cross arm, so that lubricant can be delivered without leak from the inlet 214 across said contacting surface through bore 216 into oblique bores 157$^a$ and 217 in the base of the hub 159 the latter being plugged at 217' at its outer end and delivering at a point between the bushings 160 to the cam shaft. The lubricant spreads readily from said outlet to the bushing bearing surfaces, part flowing peripherally around the shaft between the bushings and being drained through an arrangement of bores 217 and 157$^b$ similar or symmetrical to that described. The tie rod arm is bored at 218 to drain the lubricant from bore 157$^b$ to the tie rod ball stud 156 which, in this embodiment, is formed with a peripheral groove 219 for intercepting the lubricant therefrom and in turn, delivering by way of a radial bore 220 to the bearing thereof in the same manner shown at the tie rod of Fig. 1.

By the arrangement disclosed it will be seen that the bearing bushings of the brake cam shaft receive adequate lubrication, the excess being however effectively drained therefrom and accordingly kept away from the friction material of the brake. The drained excess as set forth, is not wasted, but utilized for lubricating the tie rod ball stud.

To secure substantial uniformity of division through the two conduits 209 and 213 without a substantial excess or deficiency through one or the other, controlling plugs of felt 221 are inserted into the heads of both of said pipes.

In all of the embodiments disclosed, the inlet or drip plug supplying lubricant to the knuckle feeds into a part rigid with the axle, and drains overflow in excess of the requirements of the thrust bearing well by gravity flow, the thrust bearing being shown enclosed to prevent the entry of dirt or water, without interfering with the free swiveling movement of the knuckle. This arrangement disclosed in another embodiment, is generically claimed in my copending application, above referred to, as is the arrangement of conduits and pipes, now to be briefly set forth, for preventing air blocking and siphoning, claimed herein only in special relations.

In all of the embodiments shown the dust proofing seal of the thrust bearing receptacle or distributing well may also exclude air, when it is wet with oil, with the result that the knuckle pipe or conduit system will not be vented. To obviate the consequent defective flow operation, the conduits leading lubricant to the bearings at lower level, that is to the lower king pin bearing and to the tie-rod bearing are of relatively large diameter, for example of one-quarter inch bore or more, sufficiently large to allow the lubricant to flow therethrough about any air therein. I have special reference to bore 45 and pipe 32 in Fig. 1, pipes 63 and 65 in Figs. 3 and 4, pipe 111 and bore 122 in Fig. 6 and bores 187 and 218 and pipe 213 in Figs. 8 and 10. By this arrangement lubricant admitted to the unvented pipe or bore will readily flow therethrough to the bearing. There is precluded the effect of trapped air, that might block the flow of lubricant, and only release the same after a substantial column had collected therein. The provision of the relatively large diameter pipes and conduits referred to also precludes the withdrawal through the lower king pin or tie rod bearings of lubricant that might otherwise be siphoned from the higher drag link bearing.

Inasmuch as in each of the embodiments of Figs. 1 and 3, the conduits 39 and 64 leading to the drag link ball stud, extend below the outlet of said stud, which in turn is no lower than the inlet of such pipe, blocking by air, of lubricant admitted into such pipe is inherently precluded even though the entire length thereof is, as shown, of diameter less than required to pass lubricant about any air therein. The entire length of conduit acts as a lubricant trap, and air will not enter thereinto after once the conduit has been fully charged with lubricant.

In the embodiment of Fig. 5, the entire length of conduit 112 leading to the drag link ball stud 87 is shown of large diameter, it being, of course, understood that even if the part of the length of this pipe below the level of the outlet of the ball stud 87 be of smaller diameter, yet air blocking would not occur. In this case, the same consideration applies to the upwardly extending ball stud 84 for the tie rod.

Such arrangement of enlarged upper pipe end appears in the embodiment of Fig. 8 and Fig. 10, in which the upper end of the pipe 210 down to below the level of the outlets of the drag link ball stud 153 is of larger diameter as at 210′ and below that level of smaller bore.

The construction and arrangement of piping supplied from the substantially unvented distributing well in which the thrust bearing is lodged, in general, as noted, is provided with a bore of sufficient diameter to permit the flow of lubricant therethrough about any air therein, down to a level at least as low as the various bearings supplied therefrom, while those portions of said conduits below such outlet, in which, accordingly, lubricant will be trapped, may be of smaller diameter. The bores in the outlet ball studs, however, in general, may be of small diameter regardless whether the ball extends downward or upward, since any column of oil therein, is not of sufficient weight to exert a syphoning action.

While in each of the embodiments disclosed, various bearings are supplied through bores or conduits draining overflow from a well in which the thrust bearing is lodged, the invention from its broader aspects as defined in certain of the accompanying claims, embraces a construction in which the well or chamber, in which the lubricant from the axle is delivered in the first instance, does not serve for lodging the thrust bearing, but merely as a distributing well from which other bearings are supplied.

In certain of the claims, I use the term "control bearing" or "associated bearings" as applying to one of the bearings of the knuckle. This term defines generically any of the bearings at or adjacent to the knuckle as for example bearings by which an operating adjustment on the knuckle or the wheel thereon is effected or transmitted from one to the other knuckle.

The lubricating installations of the present invention are applicable to other bearings of the automobile than the chassis bearings, and they are also applicable to the lubrication of groups of bearings other than automobile or chassis bearings. The installations may also be supplied with lubricant from a single inlet as well as from a central system.

I claim:

1. In a mechanism, the combination of a fixed bearing, a structure pivoted thereto, a thrust bearing sustaining the pivoted structure on the fixed structure, a well of diameter little larger than that of said thrust bearing and maintaining the latter submerged in oil, another bearing on said pivoted structure, a conduit supplied through the wall of said well from a level above the bottom thereof and leading to said other bearing, and lubricant supply means tending to communicate more readily to said well than to said other bearing, whereby after the thrust bearing is completely submerged additional lubricant admitted through said supply means will pass to said other bearing.

2. In a motor vehicle, in combination, an axle, a knuckle having a pivot mount thereon, a thrust bearing member, a well snugly enclosing said bearing member and carried by the upper end of the knuckle, means delivering lubricant to said well and one or more conduits supplied through the wall of said well and from a level above that of the lower part of the thrust bearing surface and extending along the structure of said knuckle to bearings thereof.

3. In a steering axle, in combination, a knuckle having a pivot bearing element at the lower end thereof and a pivot bearing element at the upper end thereof, a bearing member complementary to said latter element and rigid with the axle, a lubricant inlet rigid with the axle admitting lubricant for the knuckle, a thrust bearing in a well of substantially the same diameter as said bearing and near the upper end of the knuckle intercepting lubricant from said inlet, a conduit extending in a generally downward direction to convey lubricant from said inlet to the lower pivot bearing of the knuckle and one or more conduits extending along the structure of the knuckle to bearings thereof, all of said conduits being supplied through the wall of the thrust bearing well from above the bottom of the latter to drain lubricant therefrom.

4. In a motor vehicle in combination, an axle, a knuckle having a pivot mount thereat, a distributing well in the upper face of the knuckle, a closure cap fixed to the axle and extending about the rim of said well to maintain the latter dust proof and permitting the free swivelling movement of the knuckle, a lubricant inlet carried by the axle and supplying lubricant from within the periphery of the dust proof closure to said well, a tie rod bearing carried by the knuckle, a drag link bearing carried by the knuckle, a pipe draining lubricant from said well downward to said tie rod bearing and of bore sufficiently large to permit flow of lubricant about any air therein and a second pipe draining lubricant from said well and leading to said drag link bearing.

5. In a motor vehicle in combination, an axle, a knuckle having an upper and a lower pivot mount and including a well in the upper face thereof, means excluding dust from said well, a lubricant inlet carried by the upper part of said axle delivering lubricant into said well, a tie rod bearing carried by the knuckle, a pipe draining lubricant from said well and extending downward along the knuckle to said tie rod bearing and a conduit draining lubricant from said well and extending generally downward to said lower knuckle bearing, both of said conduits of bore sufficiently large to prevent air blocking.

6. In a motor vehicle, in combination, an axle, a knuckle having a pivot mount thereat, a thrust bearing lodged in a well in the upper face of the knuckle and coaxial with the pivot axis thereof, a dust-proofing closure extending about the rim of said well and interposed between said well and the contiguous part of the axle, a lubricant inlet carried by said axle and delivering lubricant into said well from within said closure, and a plurality of conduits draining lubricant from a level above the bottom of said well for supplying bearings associated with the knuckle, substantially all of that portion of each of said conduits above the bearing outlets being of diameter sufficiently large to permit flow of lubricant therethough about any air therein, thereby preventing air blocking or siphoning.

7. In a motor vehicle, in combination, an axle, a knuckle having pivot bearings at its upper and lower ends with respect to said axle, a tie rod bearing on said knuckle, a drag link arm on said knuckle having an upwardly extending ball stud, a thrust bearing carried in a corresponding well near the upper end of the knuckle, a substantially dust tight swivel between the fixed axle and the upper end of the knuckle, means admitting lubricant from the axle to said well, passage ways conveying lubricant from said well to said tie rod bearing, said drag link bearing and said lower knuckle pivot bearing, the oil trapping part of the length of said drag link passageway being of small diameter, too small to permit passage of lubricant about any air therein, the conduits to said tie rod, and to said lower knuckle pivot bearing being of diameter sufficiently large to permit flow of lubricant about any air therein.

8. In an axle construction of the class comprising an axle beam having a clevis, a knuckle having integral pivot bearing members one coacting with the upper jaw of the axle clevis, the other comprising a stud in a bushing carried by the lower jaw of the axle clevis, a thrust bearing sustaining the axle and lodged in a well in the upper part of the knuckle and of diameter little larger than that of said thrust bearing, and conduits extending outward from a part of the well wall above the thrust bearing surface and along the structure of the knuckle to the bearings thereof.

9. In a motor vehicle, in combination, an axle having an upper and a lower knuckle pivot bearing, a knuckle having pivot members rigid therewith and coacting with the respective axle pivot bearing members, a tie rod arm and a drag link arm rigid with said knuckle, a well at the upper end of said knuckle, a thrust bearing sustaining the axle upon the knuckle and lodged within and of diameter substantially that of said well, a conduit admitting lubricant to said well from a part rigid with the axle, and three overflow conduits extending from the upper edge of said thrust bearing well, one along the length of the drag link arm to the bearing thereof, a second along the structure of the knuckle to the tie rod bearing and a third to the lower pivot bearing of the knuckle.

10. In a motor vehicle, in combination, an axle having a clevis, a knuckle having parts rigid therewith pivoted in the jaws of said clevis, the swivel at the upper end of the knuckle with respect to the axle being substantially dust and air tight, means admitting lubricant from the axle to the upper pivot bearing, and a conduit communicating with the surface of said bearing and extending outward therefrom free from the pivot axis of the knuckle, downward to the lower bearing thereof, said conduit of diameter sufficiently large to permit flow of the lubricant therethrough about any air therein.

11. In an axle of the type comprising a clevis a knuckle having a lower pivot bearing stud integral therewith, a corresponding bearing bushing therefor in the lower jaw of the axle clevis, a thrust bearing including a race fitting in a corresponding well in the upper end of the knuckle, another race in said well upon which the axle bears and interposed rolling thrust members, means delivering lubricant from a point on said axle into said well, and an overflow bore draining lubricant from said well and extending longitudinally through said knuckle to the lower stud thereof and delivering to the bearing surface of said lower stud.

12. In a motor vehicle in combination, an axle having a clevis, a knuckle provided with upper and lower pivot bearings unitary therewith, and bearing at the jaws of said clevis, a thrust bearing in a corresponding well in the upper face of said knuckle, a drag link arm rigid with said knuckle, and having an upwardly extending ball stud at the outer end thereof, means draining lubricant from said well to the lower knuckle pivot bearing and to the drag link ball stud, said means comprising a conduit extending from the well along the drag link arm and delivering to the ball stud, the portion of said conduit below the level of the ball stud outlet being of diameter too small to permit passage of lubricant about any air therein, the bore from the well to the lower knuckle pivot bearing being of diameter sufficiently large to permit passage of lubricant about the air therein, whereby siphoning of lubricant from the drag link to the lower knuckle bearing is precluded.

13. In a motor vehicle, in combination, an axle, a knuckle having a pivot mount at the end thereof, a thrust bearing near the upper end of the knuckle, a well mounting said bearing, and rigid with the knuckle, a cap rigid with the axle, closing said well and having a dust tight swivel relation with respect therewith, a lubricant inlet in said cap delivering into the said well and lubricating said thrust bearing, and one or more conduits extending into the wall of said well, and draining lubricant from above the lowermost level of said thrust bearing face, and extending along the knuckle to bearings carried thereby.

14. In a motor vehicle steering axle of the type including an axle beam having a king pin fixed therein, a knuckle having bearings straddling said beam and bearing on the protruding ends of said king pin, a bushing in said knuckle for the upper end of said king pin having a socket thereabove and integral therewith, thrust bearing washers encircling said king pin within said socket and a nut threaded on the upper end of king pin and transmitting the downward thrust of the axle onto said thrust washers, means admitting lubricant into said well to submerge said thrust washers and one or more lubricant conduits connected to said well at a level above that of the thrust washers and leading along the structure of the knuckle to the bearings thereof.

15. In a motor vehicle in combination, an axle, a knuckle, one of said members having a clevis, a thrust bearing sustaining the weight of the axle upon the knuckle, a king pin having a plurality of bearing surfaces affording a pivot mount for said knuckle and extending centrally through said thrust bearing, and a nut threaded upon said king pin and transmitting the weight of the axle to said thrust bearing, a well enclosing said thrust bearing, means admitting lubricant to said well and a groove in the lower face of said nut communicating with a radial bore in said king pin above the level of said thrust bearing from which lubricant is drained through an axial bore in said king pin to one of the bearing surfaces associated therewith.

16. In a motor vehicle in combination, an axle having a king pin secured therein, a knuckle having a clevis straddled said axle and bearing on said king pin, the upper knuckle bearing comprising a bushing encircling said king pin and press-fitted in the said knuckle and including a well member protruding thereabove, a dust tight closure for said well rigid with said axle, a lubricant inlet through said closure causing lubricant to drip into said well, thrust bearing washers encircling said king pin and in the bottom of said well, a nut threaded upon the end of said king pin and transmitting the weight of said axle to said thrust washers, said nut having one or more grooves in the lower face thereof communicating with an annular chamber in the inner bore thereof and a radial bore in said king pin supplied therefrom draining through an axial bore to the lower king pin pivot bearing, and one or more pipes draining said well from above the level of said thrust washers and leading to bearings on said knuckle.

17. In a motor vehicle in combination, an axle and a knuckle, one having a clevis straddling the other, a king pin affording a bearing for said knuckle, a thrust bearing including a thrust washer near the upper end of the king pin sustaining the weight of the axle upon the knuckle, a well enclosing said thrust bearing, a cap rigid with said axle and forming a closure for said well, a nut threaded upon said king pin and transmitting the pressure of the axle to said thrust washer, a lubricant inlet through said cap having a delivery nozzle in the upper wall of the cap causing lubricant to drip into the well, a radial bore in said king pin removing lubricant from said well into an axial bore through said king pin from which another bearing is lubricated.

18. A steering knuckle having in combinaton, a plurality of control bearings carried thereby, means delivering lubricant to a cavity near the upper end of said knuckle and a plurality of conduits draining lubricant from said cavity and extending along the structure of the knuckle to said bearings, and wicks substantially at the inlet ends of said conduits to determine the division of lubricant therebetween, the conduit to the lower of the bearings having a considerable portion of the length thereof of diameter sufficiently large to permit flow of lubricant therethrough about any air therein, and thereby precluding siphoning from the higher bearing.

19. In a motor vehicle, in combination, an axle, a steering knuckle having a pivot mount with respect thereto, an annular thrust bearing structure sustaining said axle upon said knuckle, a concentric lubricant containing well enclosing the same, and a stand pipe extending upward from the bottom of said well and encircled by the thrust bearing structure, and determining a level of lubricant therefor and delivering the overflow therefrom to lubricate other parts of said knuckle.

20. In a motor vehicle, in combination, an axle having a clevis, a knuckle straddled thereby, pivoting studs therefor, the upper of said studs fixed in the corresponding clevis jaw, an annular combined thrust and pivot bearing structure within a corresponding well in the knuckle below the upper axle clevis jaw, a lubricant inlet fitting in the upper stud delivering through an axial bore therethrough into said thrust bearing, a stand pipe coaxial with said thrust bearing determining a level of lubricant therein and draining overflow therethrough to lubricate another bearing in said knuckle.

21. In a motor vehicle, in combination, an axle having a clevis, a knuckle straddled thereby, pivoting studs therefor, the upper of said studs fixed in the corresponding clevis jaw, an annular combined thrust and pivot bearing structure within a corresponding well in the knuckle below the upper axle clevis jaw, a lubricant inlet fitting in the upper stud delivering through an axial bore therethrough into said thrust bearing, a stand pipe coaxial with said thrust bearing determining a level of lubricant therein and draining overflow therethrough to lubricate another bearing on said knuckle, and an axial bore through the knuckle pivot axis through which lubricant is passed to the lower pivot bearing therefore.

22. In a steering axle for a motor vehicle, in combination, an axle beam, a steering knuckle pivoted thereto, brake linkage for the wheel of said knuckle operable from the frame and constructed and arranged to accommodate the various movements of the knuckle relative to the frame, the combination therewith of means for lubricating the various bearings of said knuckle and said brake linkage, said means including a flow controlling inlet to the knuckle, a flow controlling inlet to the brake linkage near the upper end thereof, both inlets supplied from a common source, both said knuckle and said brake linkage being constructed and arranged to afford gravity flow passages through which lubricant from said inlets flows to the bearings to be lubricated therefrom.

23. In a steering axle for a motor vehicle, in combination, an axle beam, a steering knuckle pivoted thereto, brake linkage for the wheel of said knuckle operable from the frame and constructed and arranged to accommodate the various movements of the knuckle relative to the frame; the combination therewith of a lubricant supply pipe on the axle having a flow controlling outlet fixed in a bearing in said brake linkage, another flow controlling outlet fixed with respect to said axle and delivering to a part of said knuckle at relatively high level, said brake linkage and said knuckle having gravity flow passages within the structure thereof delivering to various bearings associated therewith.

24. In a motor vehicle, a steering wheel brake of the type including mechanism carried on the axle above the knuckle for operation from the frame, mechanism at the lower part of the wheel, and a pitman operatively connected between said mechanisms; the combination therewith of means for lubricating the bearings of said pitman, said means comprising a lubricant inlet carried by the axle and leading into said first mechanism, a passage to the upper end of the pitman for lubricating a bearing thereof, said pitman being hollow and conveying lubricant downward therefrom to the lower bearing thereof.

25. A steering wheel brake mechanism of the type including a rock shaft carried by the axle at a relatively high level and operated from the frame, an arm rigid therewith having a ball stud at the outer end thereof, a pitman link having ball cups at the upper end thereof co-acting with said stud, a brake, an arm rigid therewith having a ball stud, and ball cups at the lower end of said pitman link coacting with said ball stud, said link being hollow, means for lubricating from the frame the bearings of said pitman link, said means comprising a lubricant inlet carried by the axle and feeding into a bearing of said rock shaft, said shaft having a bore therein draining lubricant from said inlet and delivering into a bore in the corresponding arm, the upper ball stud having a bore draining lubricant from said arm bore and delivering through the ball to the bearing thereof, excess flowing downward through the hollow link to the ball stud at the lower end thereof.

26. In a motor vehicle, in combination, an axle, a knuckle pivoted thereto, said knuckle including a brake setting rock shaft and a tie rod bearing, means admitting lubricant to said knuckle near an upper part thereof, and a passageway along said knuckle conveying lubricant to said rock shaft, and a passageway draining excess lubricant from said rock shaft into the bearing of the tie rod.

27. In a motor vehicle in combination, a steering knuckle forging, a knuckle control bearing carried thereby, a hub plate member secured to said steering knuckle forging and in face to face contact therewith, the hub of said plate extending through a corresponding aperture in said steering knuckle forging at lever higher than said control bearing, bushings in the opposite ends of said hub, a brake setting shaft bearing in said bushings, means admitting lubricant through said steering knuckle forging and across the contacting face into said hub plate to drain to said brake setting shaft between the bushings thereof and a draining passage from between said bushings through said hub plate across the contact surface to said knuckle control bearing.

28. In a motor vehicle, in combination, an axle, a steering knuckle pivoted thereto, said knuckle having a unitary extension, a plate bolted thereto and provided with a bearing hub, a brake setting member having a rock shaft bearing in said hub, said knuckle having a tie rod bearing, means for lubricating said brake setting shaft and said tie rod bearing, said means including an inlet fitting carried by said knuckle extension and feeding through a port therethrough into a corresponding port in the plate which delivers to the bearing of the brake setting member, and a draining port arrangement through said plate into said knuckle extension, said extension and the tie rod arm having passageways delivering said lubricant to the tie rod bearing.

29. In a steering knuckle of the type including a cross-bar unitary therewith, a cover plate bolted thereto and having a hub unitary therewith, a brake setting rock shaft having a bearing in said hub, a tie rod rigid with said cross-bar and adjacent said bearing, a lubricant supply conduit extending generally downward along said knuckle into said cross-bar and a system of bores through said cross-bar, said cover plate and the tie rod arm leading the lubricant to said shaft and draining from said shaft into said tie rod bearings.

30. In a motor vehicle of the type including an axle having a clevis, a knuckle forging straddled by said clevis, said forging having a cross arm unitary therewith, a cover plate bolted thereto and having a hub unitary therewith, a brake setting rock shaft having a bearing in said hub arm, a tie rod bearing arm rigid with the outer end of said cross arm, a drag link arm rigid with said cross arm, a lubricant inlet carried by a part rigid with said axle, a thrust bearing at the upper end of said knuckle intercepting lubricant from said inlet, an overflow conduit through said cross bar, a pipe supplied therefrom and extending downward to the bearing of said drag link, a second overflow pipe extending along the cross arm into the cover plate supporting part thereof, and a system of bores through said part and said cover plate, said hub and said tie rod arm and delivering the lubricant in cascade to said rock shaft and said tie rod bearing.

31. The combination set forth in claim 30 in which a stand pipe protrudes upward from the bottom of the well and drains overflow therefrom axially through said knuckle to supply the lower pivot bearing thereof.

32. In a motor vehicle in combination, a ball stud having a taper shank, a supporting member including a taper eye for said shank, a collar about the shank, a nut threaded upon the end of the said shank and pressing said collar against said eye and a lubricant inlet through said collar delivering to a radial bore in said shank in turn communicating with one or more radial bores in said ball, whereby lubricant is delivered to the ball stud without traversing the taper-fitted portion.

33. In a steering knuckle bearing in combination, an arm carried by the knuckle and having an eye therein, a ball stud having a taper fit in said eye, a hollow collar member encircling said stud, a nut closed at the outer end of its bore, threaded upon the end of said shank and pressing said hollow collar against said eye to tighten the taper joint, means for supplying lubricant to said ball stud, said means comprising a pipe extending along said knuckle arm and having a terminal in said hollow collar delivering to a contiguous radial bore in said stud in turn delivering to an axial bore through said stud which delivers through one or more radial bores in the ball to the bearing surface thereof.

34. A motor vehicle axle of the type including an axle end with upper and lower clevis jaws, a knuckle having a lower pivot stud integral therewith and having a well in its upper face carrying a thrust bearing, the inner race of which is at the lower end of a pivot stud press-fitted into the upper axle clevis jaw, and in which the lower clevis jaw has a large opening to permit insertion of the shank of the knuckle preparatory to the completion of the assembly; the combination therewith of a lower pivot bearing comprising a flanged sleeve press-fitted on the lower pivot stud of the knuckle, a bushing extending into the knuckle eye and about the sleeve, a nut threaded upon the upper end of said bushing and drawing the same against said collar flange, and means closing said bushing below said lower pivot stud.

35. The combination set forth in claim 34 in which an annular gasket is compressed into a corresponding annular space determined between the bushing and the flange of the sleeve to render the construction substantially dust-proof.

36. A motor vehicle axle of the type including an axle end with upper and lower clevis jaws, a knuckle having a lower pivot stud integral therewith, and having a well in its upper face carrying a thrust bearing, the inner race of which is at the lower end of a pivot stud press-fitted into the upper axle clevis jaw and in which the lower clevis jaw has a large opening to permit insertion of the shank of the knuckle preparatory to the completion of the assembly; the combination therewith of a lower pivot bearing comprising a flanged sleeve press-fitted upon the lower pivot stud of the knuckle, a bushing extending into the knuckle eye and about the sleeve, and a nut threaded upon the upper end of said bushing and drawing the same against said sleeve flange, means closing said bushing below said king pin, and a lock bolt securing both the nut and the bushing against displacement.

37. In a mechanism including a rock shaft, a sleeve carrying the same, said shaft bearing in said sleeve, a rocker arm carried by said shaft, a ball stud carried by said arm, and a pitman link enclosing and forming a bearing for the ball of said stud at one of its ends; a lubricating installation including an inlet at said sleeve, a shaft bore through said shaft receiving lubricant from said sleeve, an arm bore through said arm receiving lubricant from said shaft bore, and a stud bore receiving lubricant from said arm bore and supplying it to said pitman bearing.

JOSEPH BIJUR.